United States Patent
Mathe et al.

(10) Patent No.: US 8,294,767 B2
(45) Date of Patent: Oct. 23, 2012

(54) BODY SCAN

(75) Inventors: Zsolt Mathe, Issaquah, WA (US); Charles Claudius Marais, Duvall, WA (US); Ryan Michael Geiss, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 12/363,542

(22) Filed: Jan. 30, 2009

(65) Prior Publication Data

US 2010/0194872 A1 Aug. 5, 2010

(51) Int. Cl.
*H04N 7/18* (2006.01)
(52) U.S. Cl. ........ 348/154; 348/155; 348/144; 348/151; 348/156
(58) Field of Classification Search .................. 348/153, 348/154, 144, 151, 155, 156
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |

(Continued)

FOREIGN PATENT DOCUMENTS

CN 201254344 B 6/2010

(Continued)

OTHER PUBLICATIONS

He, "Generation of Human Body Models", The University of Auckland, Master of Science in Computer Science, Thesis Paper, Apr. 2005, 111 pages.

(Continued)

*Primary Examiner* — Djenane Bayard
(74) *Attorney, Agent, or Firm* — Woodcock Washburn LLP

(57) ABSTRACT

A depth image of a scene may be received, observed, or captured by a device. The depth image may then be analyzed to determine whether the depth image includes a human target. For example, the depth image may include one or more targets including a human target and non-human targets. Each of the targets may be flood filled and compared to a pattern to determine whether the target may be a human target. If one or more of the targets in the depth image includes a human target, the human target may be scanned. A skeletal model of the human target may then be generated based on the scan.

18 Claims, 12 Drawing Sheets

U.S. PATENT DOCUMENTS

| | | |
|---|---|---|
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,711,432 B1 | 3/2004 | Krause et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,771,277 B2 | 8/2004 | Ohba |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,999,084 B2 | 2/2006 | Mochizuki et al. |
| 7,003,134 B1 | 2/2006 | Covell et al. |
| 7,006,236 B2 | 2/2006 | Tomasi et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,151,530 B2 | 12/2006 | Roeber et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,333,111 B2 | 2/2008 | Ng-Thow-Hing et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,386,150 B2 | 6/2008 | Fleisher |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |

| | | |
|---|---|---|
| 7,746,345 B2 | 6/2010 | Hunter |
| 7,760,182 B2 | 7/2010 | Ahmad et al. |
| 7,760,923 B2 | 7/2010 | Walker et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,009,867 B2 | 8/2011 | Mathe et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2003/0091225 A1 | 5/2003 | Chen |
| 2004/0021660 A1 | 2/2004 | Ng-Thow-Hing et al. |
| 2004/0155962 A1 | 8/2004 | Marks |
| 2004/0207597 A1 | 10/2004 | Marks |
| 2005/0059488 A1 | 3/2005 | Larsen et al. |
| 2006/0050952 A1 | 3/2006 | Blais et al. |
| 2006/0152507 A1 | 7/2006 | Lee et al. |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0026838 A1 | 1/2008 | Dunstan et al. |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0152191 A1 | 6/2008 | Fujimura et al. |
| 2008/0170749 A1* | 7/2008 | Albertson et al. ............ 382/103 |
| 2008/0215972 A1 | 9/2008 | Zalewski et al. |
| 2008/0215973 A1 | 9/2008 | Zalewski et al. |
| 2009/0002489 A1 | 1/2009 | Yang et al. |
| 2009/0010490 A1* | 1/2009 | Wang et al. .................... 382/103 |
| 2009/0034791 A1 | 2/2009 | Doretto et al. |
| 2009/0115849 A1* | 5/2009 | Landers et al. ............... 348/150 |
| 2009/0128632 A1* | 5/2009 | Goto et al. .................... 348/169 |
| 2009/0141933 A1 | 6/2009 | Wagg |
| 2009/0167679 A1 | 7/2009 | Klier et al. |
| 2009/0221368 A1 | 9/2009 | Yen et al. |
| 2010/0194872 A1 | 8/2010 | Mathe et al. |
| 2010/0195867 A1 | 8/2010 | Kipman et al. |
| 2010/0277470 A1 | 11/2010 | Margolis |
| 2010/0277489 A1 | 11/2010 | Geisner et al. |
| 2010/0303290 A1 | 12/2010 | Mathe |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | WO 99/15863 A1 | 4/1999 |
| WO | 99/44698 A1 | 9/1999 |
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

PCT Application No. PCT/US2010/1020794 : International Search Report and Written Opinion of the International Searching Authority, Aug. 13, 2010, 8 pages.

Qian et al., "A Gesture-Driven Multimodal Interactive Dance System", IEEE International Conference on Multimedia and Expo, Taipei, Jun. 30, 2004, 3, 4 pages.

Rosenhahn et al., "Automatic Human Model Generation", University of Auckland, Nov. 2005, 41-48.

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Zhao, "Dressed Human Modeling, Detection, and Parts Localization", CMU-RI-TR-01-19, The Robotics Institute, Carnegie Mellon University, Pittsburgh, PA, Jul. 26, 2001, 121 pages.

Xu, Fegliang and Fujimura, Kikuo; Human Detection Using Depth and Gray Images; Proceedings of the IEEE Conference on Advanced Video and Signal Based Surveillance (AVSS '03); 2003; http://eeexplore.ieee.org/stamp/stamp.jsp?arnumber=1217910 &isnumber=27377.

Grammalidis, Nikos et al; 3-D Human Body Tracking From Depth Image Using Analysis by Synthesis; Department of Electrical Computer Engineering, University of Thessaloniki; 2001, pp. 185-188; http://www.iti.gr/files/c06.pdf.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Doulamis, et al, "Intelligent Techniques for Image Sequence Analysis: Towards Semantic Video Object Segmentation", National Technical University of Athens, Department of Electrical and Computer Engineering, Accessed on Dec. 4, 2008, 4 pages.

Micilotta and Bowden, "View-based Location and Tracking of Body Parts for Visual Interaction", CVSSP, SEPS, University of Surrey, Guildford, United Kingdom, 2004, 849-858, (no month available) 2004, 849-858.

Srinivasan and Shi, "Bottom-Up Recognition and Parsing of the Human Body", Lecture Notes in Computer Science, Energy Minimization Methods in Computer Vision and Pattern Recognition, Aug. 14, 2007, vol. 4679, 153-168.

Mustafa Shabbir Kurbanhusen, Guilin Yang, Song Huat Yeo, Wei Lin: Self-Identification of the Joint Centre of a Cable-Driven Shoulder Rehabilitator. ICRA Apr. 10-14, 2007: 3767-3772.

Reinbolt et al, Determination of patient-specific multi-joint kinematic models through two-level optimization, Journal of Biomechanics 38 (Mar. 2005) 621-626.

M. Villa-Uriol, F. Kuester, N. Bagherzadeh, A. Perez, and J. M. McCarthy. "Hierarchical kinematic synthesis of motion for avatars creation". Submitted to SIGGRAPH 2005.

Hyewon Seo, Young in Yeo, KwangYun Wohn: 3D Body Reconstruction from Photos Based on Range Scan. Edutainment 2006: 849-886.

Dian-yong Zhang; Zhen-jiang Miao; "3D Human shape reconstruction from photographs based template model," ICSP 2008, 9th International Conference on Signal Processing, Oct. 26-29, 2008, 1465-1468.

Hyewon Seo, Nadia Magnenat-Thalmann: An automatic modeling of human bodies from sizing parameters. Proceedings of the 2003 symposium on Interactive 3D graphics, 2003, 19-26.

J.F. O'Brien, R.E. Bodenheimer, G.J. Brostow, and J.K. Hodgins, "Automatic Joint Parameter Estimation from Magnetic Motion Capture Data", In Proceedings of Graphics Interface, May 2000, 53-60.

Villa-Uriol et al., "Kinematic Synthesis of Avatar Skeletons from Visual Data", Advances in Robot Kinematics, SestriLevante, Jun. 2004, J. Lenarcic and C. Galletti, eds., Kluwer Academic Publishing, 2004.

* cited by examiner

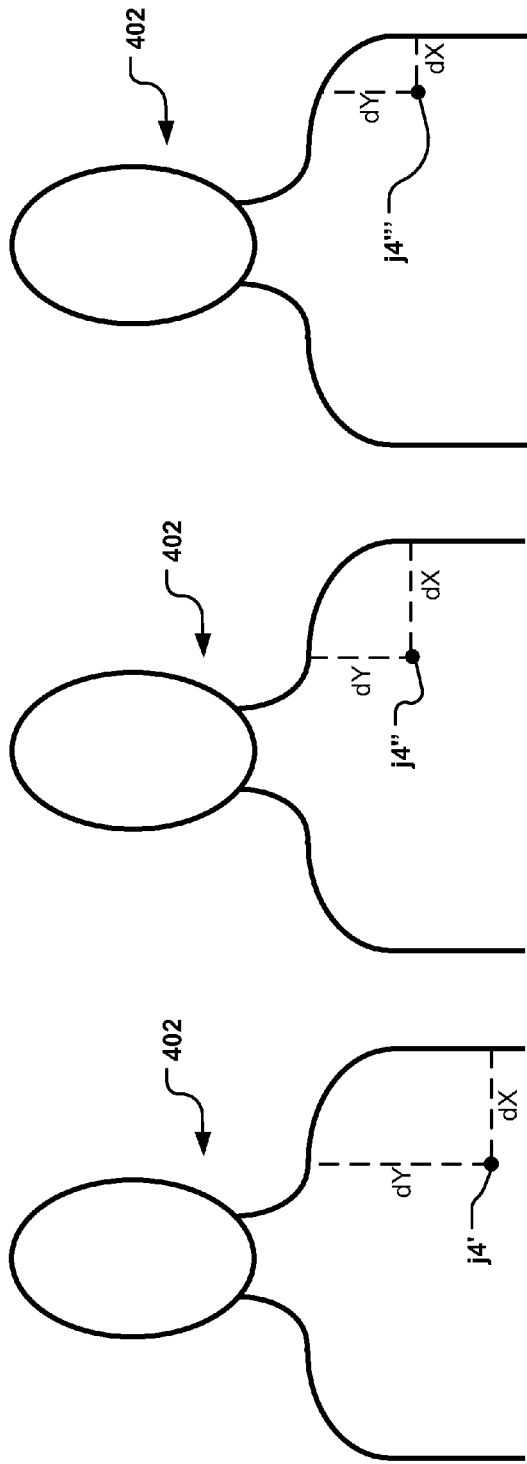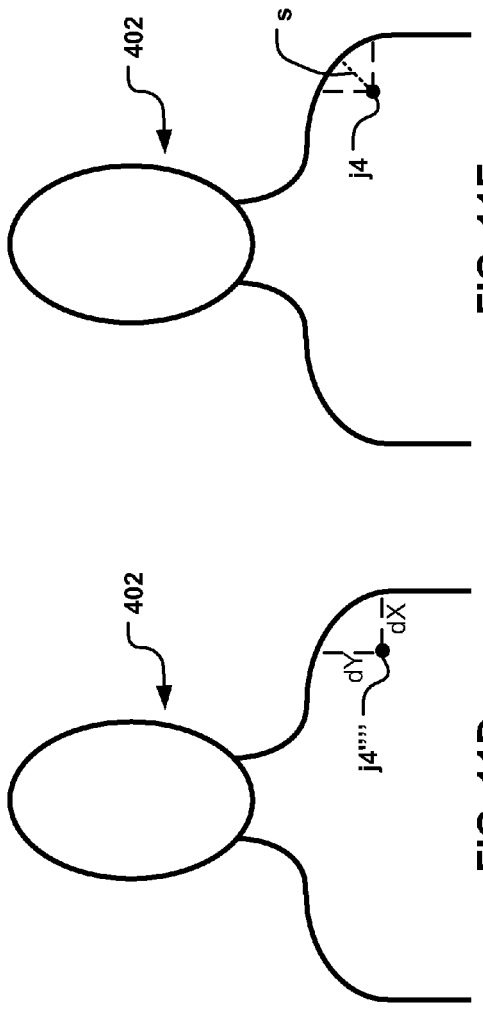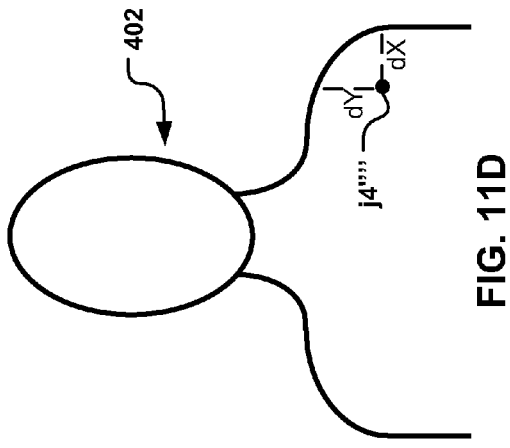
FIG. 11A
FIG. 11B
FIG. 11C
FIG. 11D
FIG. 11E

BODY SCAN

BACKGROUND

Many computing applications such as computer games, multimedia applications, or the like use controls to allow users to manipulate game characters or other aspects of an application. Typically such controls are input using, for example, controllers, remotes, keyboards, mice, or the like. Unfortunately, such controls can be difficult to learn, thus creating a barrier between a user and such games and applications. Furthermore, such controls may be different than actual game actions or other application actions for which the controls are used. For example, a game control that causes a game character to swing a baseball bat may not correspond to an actual motion of swinging the baseball bat.

SUMMARY

Disclosed herein are systems and methods for capturing depth information of a scene that may be used to process a human input. For example, a depth image of a scene may be received or observed. The depth image may then be analyzed to determine whether the depth image includes a human target. For example, the depth image may include one or more targets including a human target and non-human targets. According to an example embodiment, portions of the depth image may be flood filled and compared to a pattern to determine whether the target may be a human target. If one or more of the targets in the depth image includes a human target, the human target may be scanned. A model of the human target may then be generated based on the scan.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 11A-11E illustrate an example embodiment of a joint being adjusted for a skeletal model of a human target.

DETAILED DESCRIPTION OF ILLUSTRATIVE EMBODIMENTS

As will be described herein, a user may control an application executing on a computing environment such as a game console, a computer, or the like by performing one or more gestures. According to one embodiment, the gestures may be received by, for example, a capture device. For example, the capture device may capture a depth image of a scene. In one embodiment, the capture device may determine whether one or more targets or objects in the scene corresponds to a human target such as the user. To determine whether a target or object in the scene corresponds a human target, each of the targets, objects or any part of the scene may be flood filled and compared to a pattern of a human body model. Each target or object that matches the pattern may then be scanned to generate a model such as a skeletal model, a mesh human model, or the like associated therewith. The model may then be provided to the computing environment such that the computing environment may track the model, render an avatar associated with the model, determine clothing, skin and other colors based on a corresponding RGB image, and/or determine which controls to perform in an application executing on the computer environment based on, for example, the model.

Figure 1A:
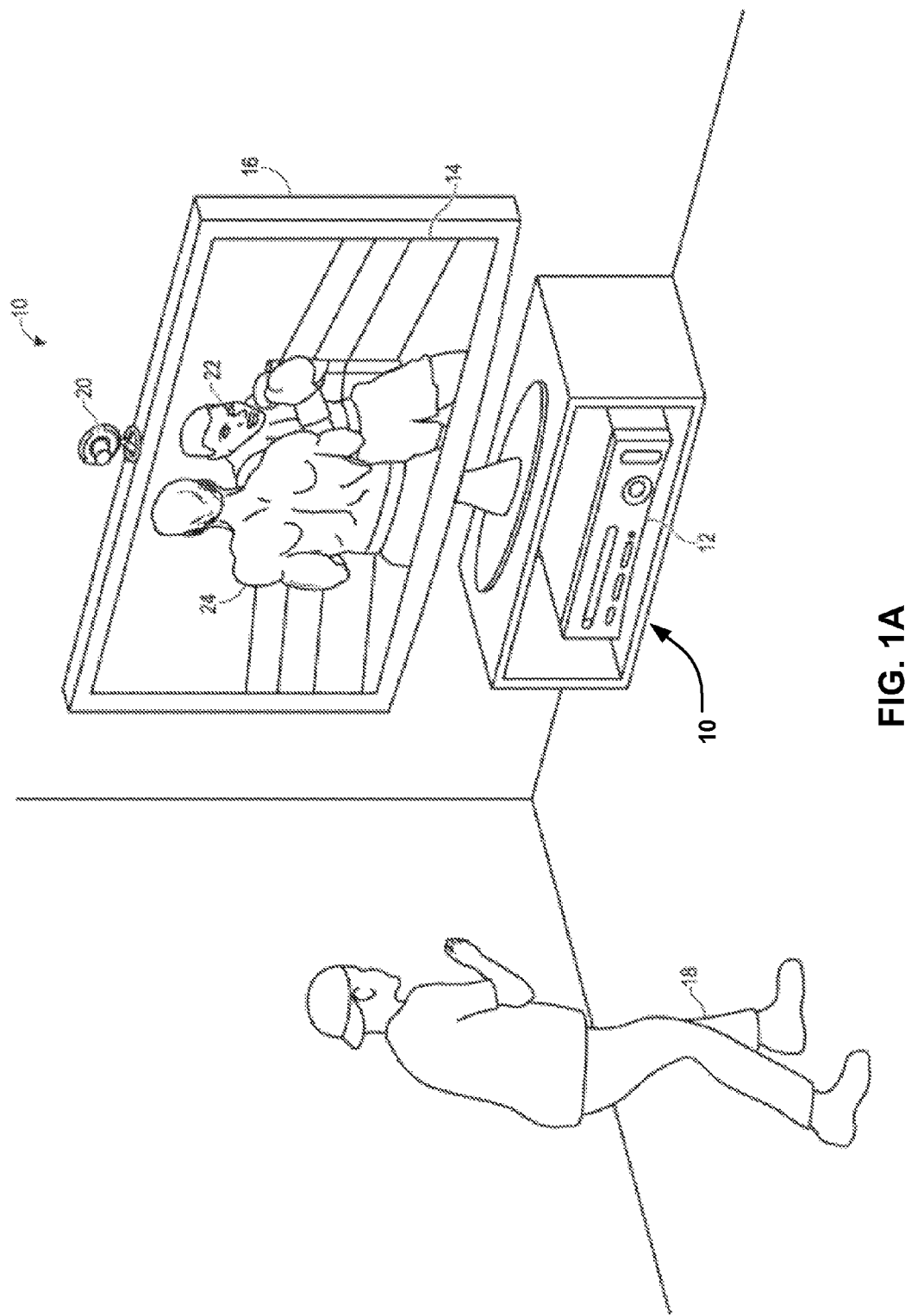
FIGS. 1A and 1B illustrate an example embodiment of a target recognition, analysis, and tracking system with a user playing a game.
Figure 1B:
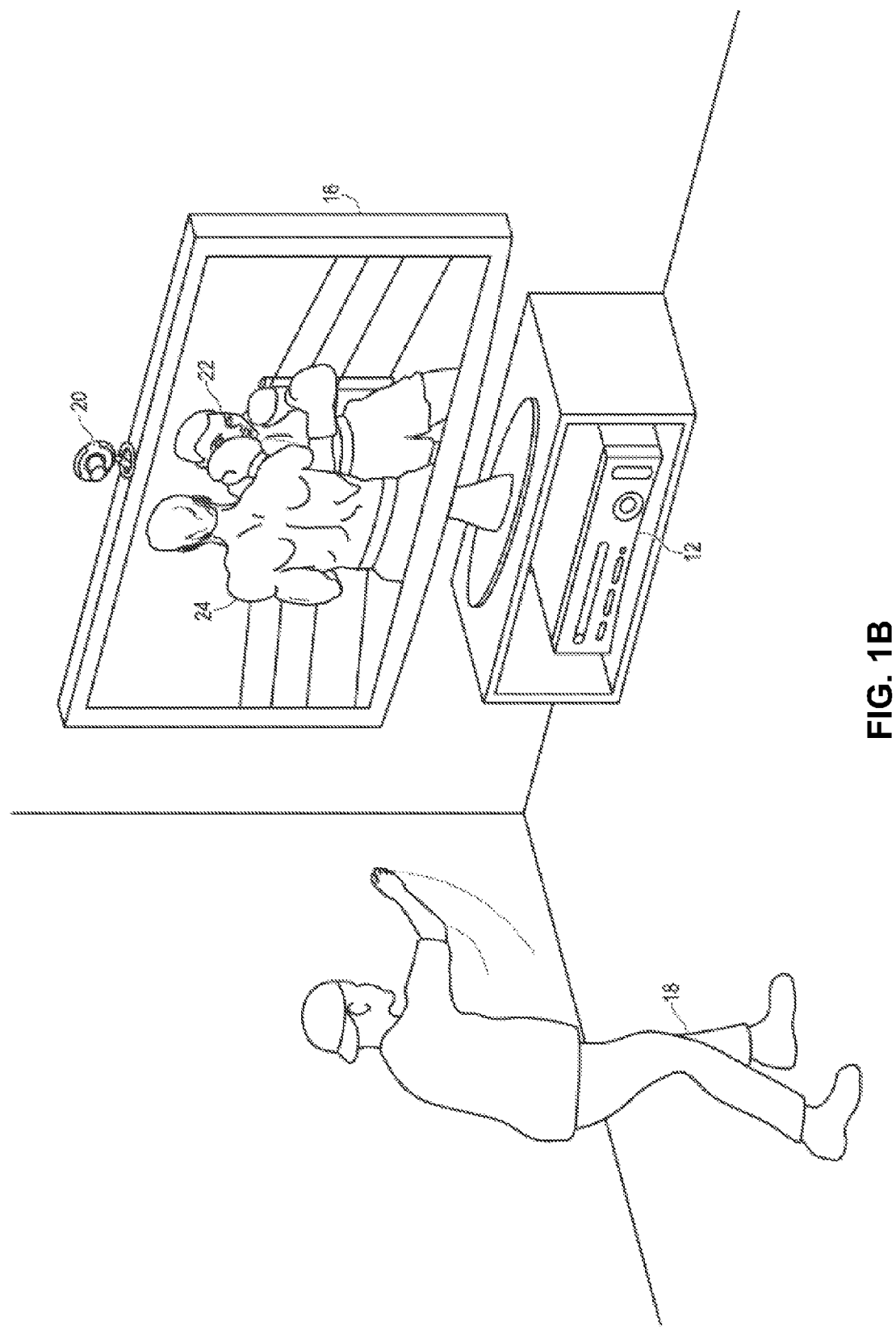

FIGS. 1A and 1B illustrate an example embodiment of a configuration of a target recognition, analysis, and tracking system 10 with a user 18 playing a boxing game. In an example embodiment, the target recognition, analysis, and tracking system 10 may be used to recognize, analyze, and/or track a human target such as the user 18.

As shown in FIG. 1A, the target recognition, analysis, and tracking system 10 may include a computing environment 12. The computing environment 12 may be a computer, a gaming system or console, or the like. According to an example embodiment, the computing environment 12 may include hardware components and/or software components such that the computing environment 12 may be used to execute applications such as gaming applications, non-gaming applications, or the like.

As shown in FIG. 1A, the target recognition, analysis, and tracking system 10 may further include a capture device 20. The capture device 20 may be, for example, a camera that may be used to visually monitor one or more users, such as the user 18, such that gestures performed by the one or more users may be captured, analyzed, and tracked to perform one or more controls or actions within an application, as will be described in more detail below.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, the target recognition, analysis, and tracking system 10 may be used to recognize, analyze, and/or track a human target such as the user 18. For example, the user 18 may be tracked using the capture device 20 such that the movements of user 18 may be interpreted as controls that may be used to affect the application being executed by computer environment 12. Thus, according to one embodiment, the user 18 may move his or her body to control the application.

As shown in FIGS. 1A and 1B, in an example embodiment, the application executing on the computing environment 12 may be a boxing game that the user 18 may be playing. For example, the computing environment 12 may use the audiovisual device 16 to provide a visual representation of a boxing opponent 22 to the user 18. The computing environment 12 may also use the audiovisual device 16 to provide a visual representation of a player avatar 24 that the user 18 may control with his or her movements. For example, as shown in FIG. 1B, the user 18 may throw a punch in physical space to cause the player avatar 24 to throw a punch in game space. Thus, according to an example embodiment, the computer environment 12 and the capture device 20 of the target recognition, analysis, and tracking system 10 may be used to recognize and analyze the punch of the user 18 in physical space such that the punch may be interpreted as a game control of the player avatar 24 in game space.

Other movements by the user 18 may also be interpreted as other controls or actions, such as controls to bob, weave, shuffle, block, jab, or throw a variety of different power punches. Furthermore, some movements may be interpreted as controls that may correspond to actions other than controlling the player avatar 24. For example, the player may use movements to end, pause, or save a game, select a level, view high scores, communicate with a friend, etc. Additionally, a full range of motion of the user 18 may be available, used, and analyzed in any suitable manner to interact with an application.

In example embodiments, the human target such as the user 18 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to other example embodiments, the target recognition, analysis, and tracking system 10 may further be used to interpret target movements as operating system and/or application controls that are outside the realm of games. For example, virtually any controllable aspect of an operating system and/or application may be controlled by movements of the target such as the user 18.

Figure 2:
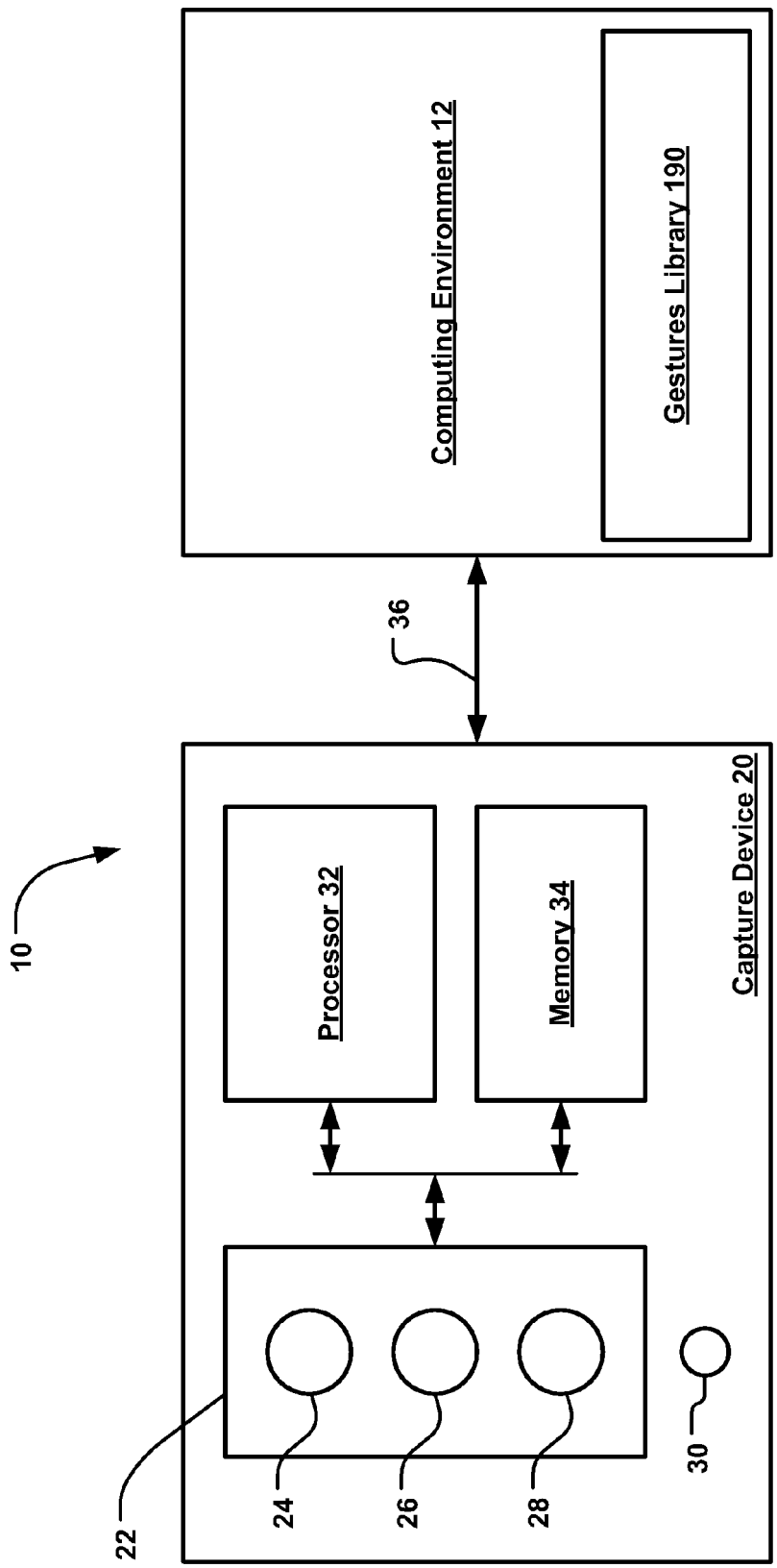
FIG. 2 illustrates an example embodiment of a capture device that may be used in a target recognition, analysis, and tracking system.

FIG. 2 illustrates an example embodiment of the capture device 20 that may be used in the target recognition, analysis, and tracking system 10. According to an example embodiment, the capture device 20 may be configured to capture video with depth information including a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 2, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 2, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, the capture device 20 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device to a particular location on the targets or objects.

According to another embodiment, the capture device 20 may include two or more physically separated cameras that may view a scene from different angles, to obtain visual stereo data that may be resolved to generate depth information The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image capture component 22 and the processor 32. According to another embodiment, the memory component 34 may be integrated into the processor 32 and/or the image capture component 22.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. The computing environment 12 may then use the skeletal model, depth information, and captured images to, for example, control an application such as a game or word processor. For example, as shown, in FIG. 2, the computing environment 12 may include a gestures library 190. The gestures library 190 may include a collection of gesture filters, each comprising information concerning a gesture that may be performed by the skeletal model (as the user moves). The data captured by the cameras 26, 28 and device 20 in the form of the skeletal model and movements associated with it may be compared to the gesture filters in the gesture library 190 to identify when a user (as represented by the skeletal model) has performed one or more gestures. Those gestures may be associated with various controls of an application. Thus, the computing environment 12 may use the gestures library 190 to interpret movements of the skeletal model and to control an application based on the movements.

Figure 3:
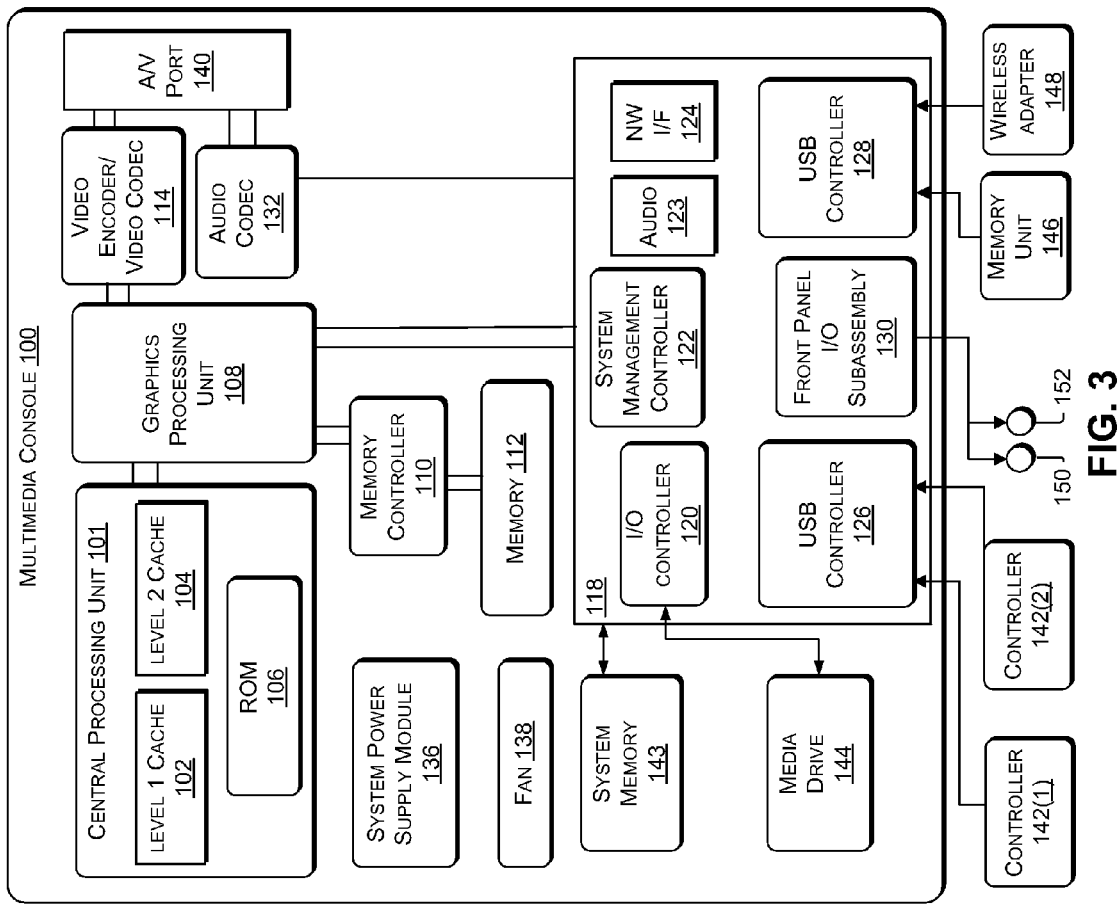
FIG. 3 illustrates an example embodiment of a computing environment that may be used to interpret one or more gestures in a target recognition, analysis, and tracking system.

FIG. 3 illustrates an example embodiment of a computing environment that may be used to interpret one or more gestures in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 20 may define additional input devices for the console 100.

Figure 4:
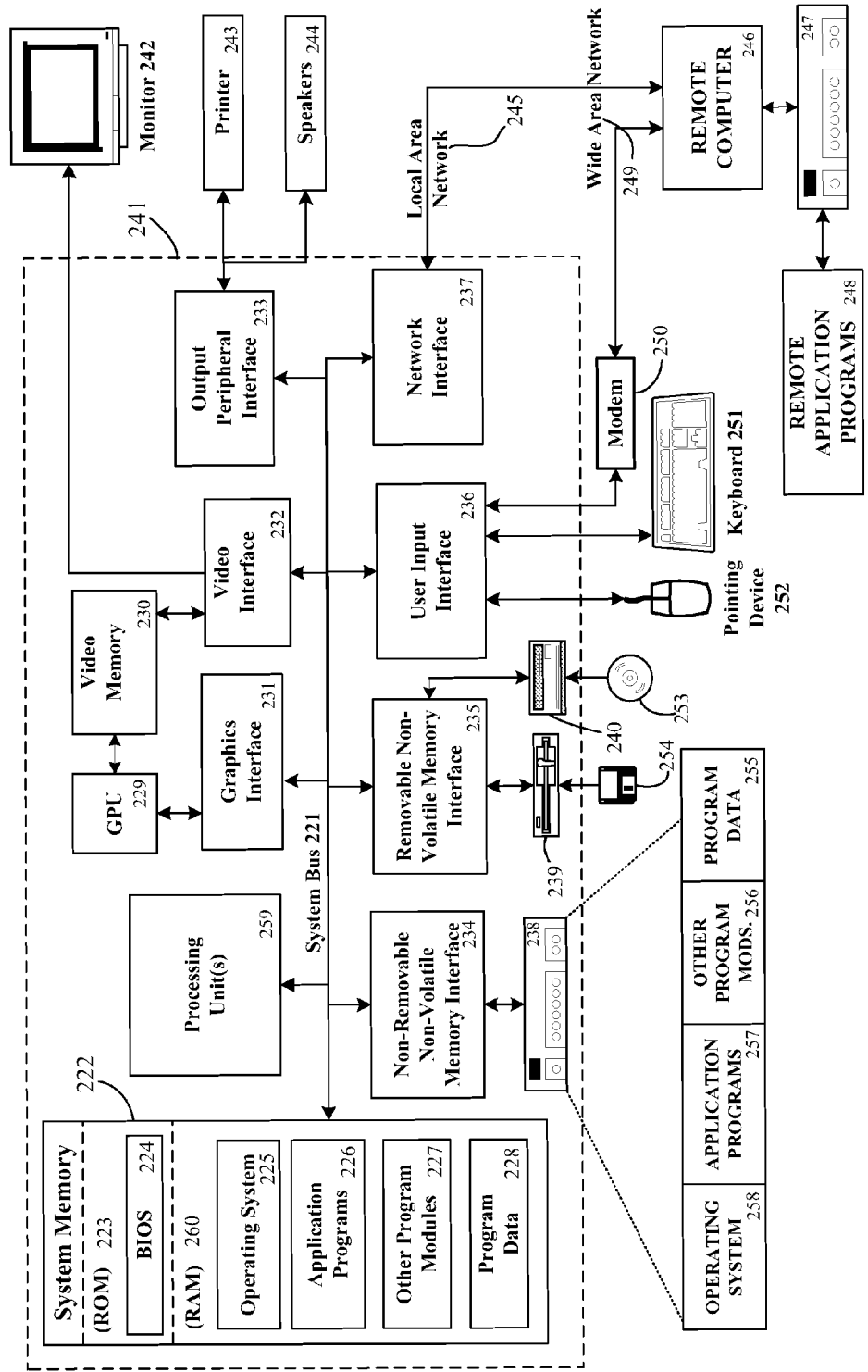
FIG. 4 illustrates another example embodiment of a computing environment that may be used to interpret one or more gestures in a target recognition, analysis, and tracking system.

FIG. 4 illustrates another example embodiment of a computing environment 220 that may be the computing environment 12 shown in FIGS. 1A-2 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
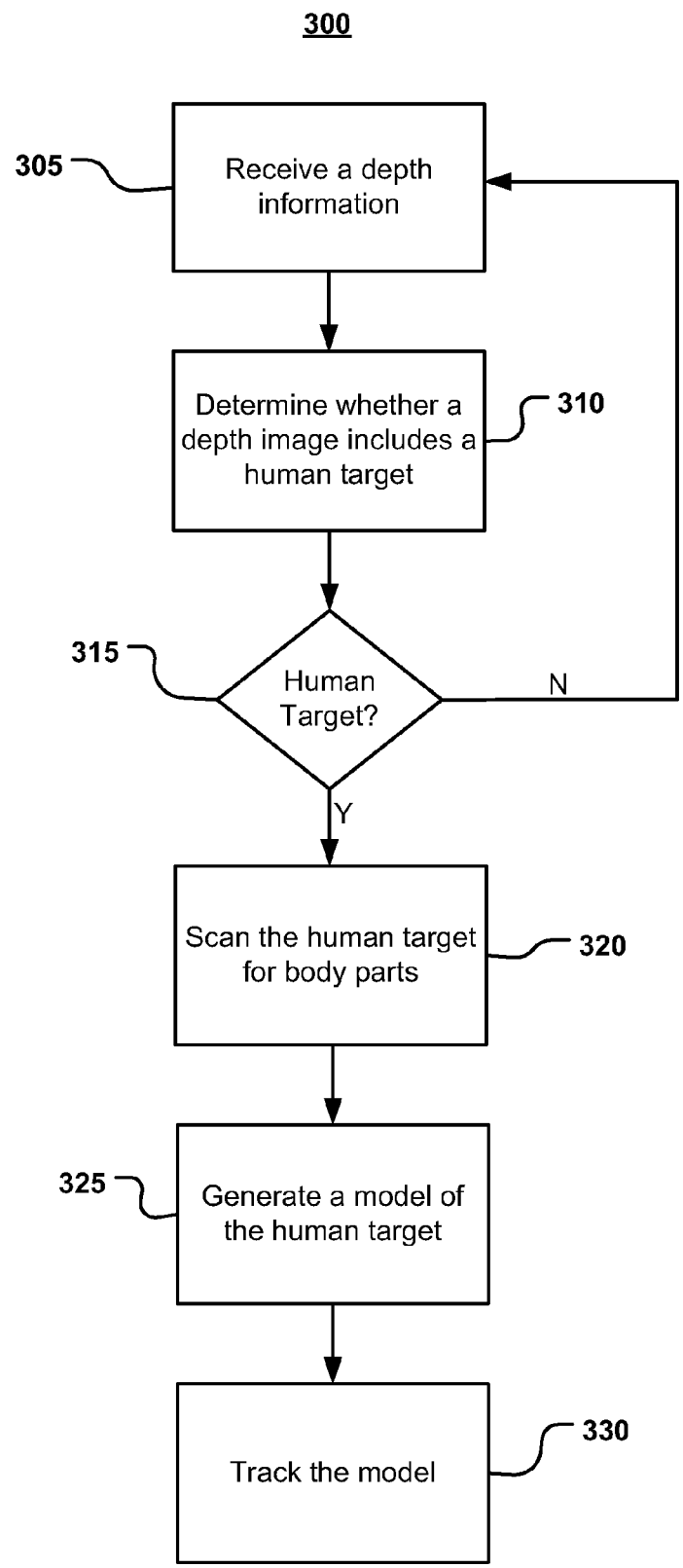
FIG. 5 depicts a flow diagram of an example method for scanning a target that may be visually tracked.

FIG. 5 depicts a flow diagram of an example method 300 for scanning a target that may be visually tracked. The example method 300 may be implemented using, for example, the capture device 20 and/or the computing environment 12 of the target recognition, analysis, and tracking system 10 described with respect to FIGS. 1A-4. According to an example embodiment, the target may be a human target, a human target with an object, two or more human targets, or the like that may be scanned to generate a model such as a skeletal model, a mesh human model, or any other suitable representation thereof. The model may then be used to interact with an application that may be executed by the computing environment 12 described above with respect to FIGS. 1A-1B. According to an example embodiment, the target may be scanned to generate the model when an application may be started or launched on, for example, the computing environment 12 and/or periodically during execution of the application on, for example, the computing environment 12.

For example, as described above, the target may include the user 18 described above with respect to FIGS. 1A-1B. The target may be scanned to generate a skeletal model of, for example, the user 18 that may be tracked such that physical movements or motions of the user 18 may act as a real-time user interface that adjusts and/or controls parameters of an application such as an electronic game. For example, the tracked motions of a user may be used to move an on-screen character or avatar in an electronic role-playing game; to control an on-screen vehicle in an electronic racing game; to control the building or organization of objects in a virtual environment; or to perform any other suitable controls of an application.

According to one embodiment, at 305, depth information may be received. For example, the target recognition, analysis, and tracking system may include a capture device such as the capture device 20 described above with respect to FIGS. 1A-2. The capture device may capture or observe a scene that may include one or more targets. In an example embodiment, the capture device may be a depth camera configured to obtain depth information associated with the one or more targets in the scene using any suitable technique such as time-of-flight analysis, structured light analysis, stereo vision analysis, or the like.

According to an example embodiment, the depth information may include a depth image. The depth image may be a plurality of observed pixels where each observed pixel has an observed depth value. For example, the depth image may include a two-dimensional (2-D) pixel area of the captured scene where each pixel in the 2-D pixel area may represent a depth value such as a length or distance in, for example, centimeters, millimeters, or the like of an object in the captured scene from the capture device.

Figure 6:
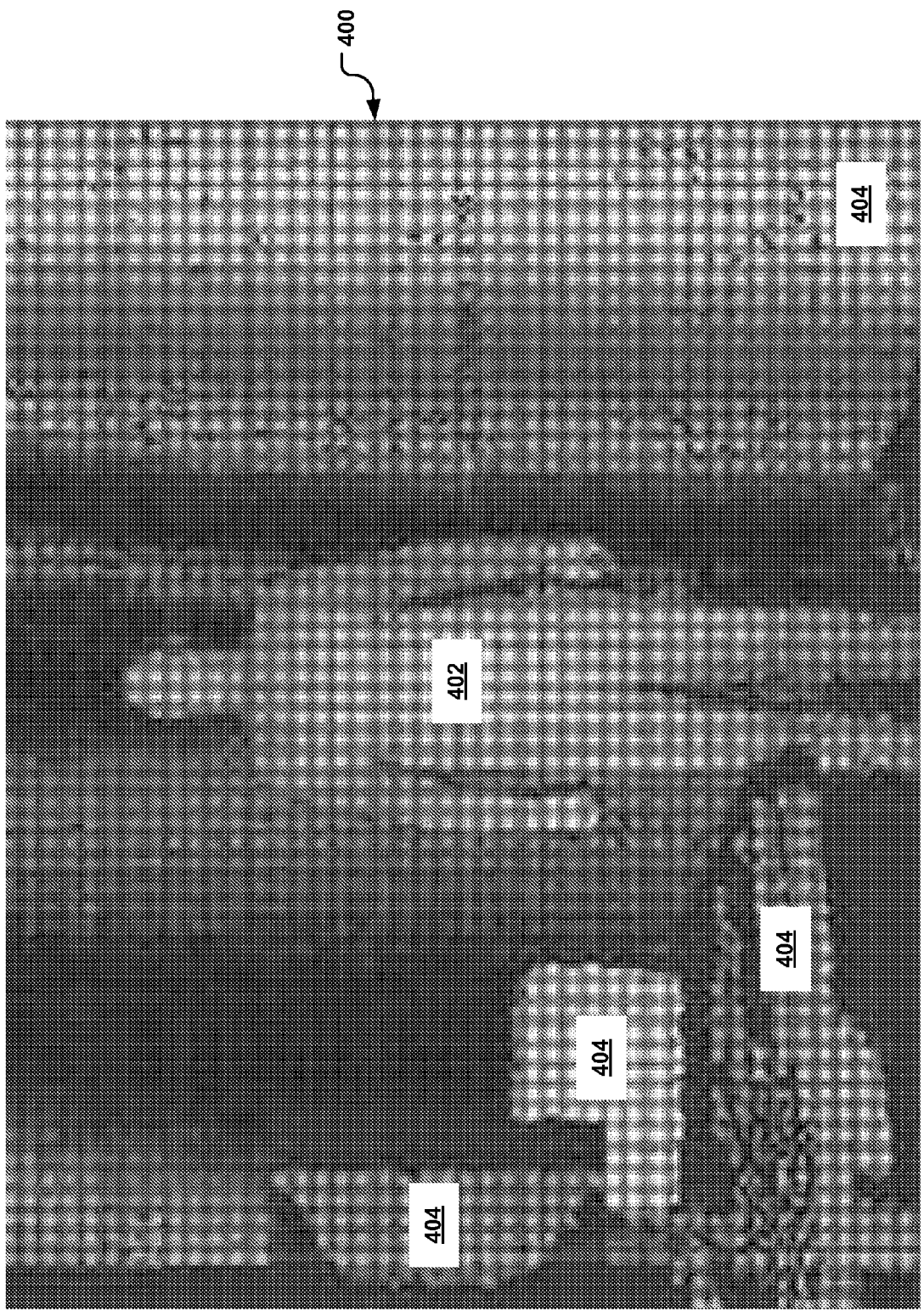
FIG. 6 illustrates an example embodiment of a depth image.

FIG. 6 illustrates an example embodiment of a depth image 400 that may be received at 305. According to an example embodiment, the depth image 400 may be an image or frame of a scene captured by, for example, the 3-D camera 26 and/or the RGB camera 28 of the capture device 20 described above with respect to FIG. 2. As shown in FIG. 6, the depth image 400 may include a human target 402 and one or more non-human targets 404 such as a wall, a table, a monitor, or the like in the captured scene. As described above, the depth image 400 may include a plurality of observed pixels where each observed pixel has an observed depth value associated therewith. For example, the depth image 400 may include a two-dimensional (2-D) pixel area of the captured scene where each pixel in the 2-D pixel area may represent a depth value such as a length or distance in, for example, centimeters, millimeters, or the like of a target or object in the captured scene from the capture device. In one example embodiment, the depth image 400 may be colorized such that different colors of the pixels of the depth image correspond to different distances of the human target 402 and non-human targets 404 from the capture device. For example, according to one embodiment, the pixels associated with a target closest to the capture device may be colored with shades of red and/or orange in the depth image whereas the pixels associated with a target further away may be colored with shades of green and/or blue in the depth image.

Referring back to FIG. 3, in one embodiment, upon receiving the depth image with, for example, the depth information at 305, the depth image may be downsampled to a lower processing resolution such that the depth image may be more easily used and/or more quickly processed with less computing overhead. Additionally, one or more high-variance and/or noisy depth values may be removed and/or smoothed from the depth image; portions of missing and/or removed depth information may be filled in and/or reconstructed; and/or any other suitable processing may be performed on the received depth information may such that the depth information may used to generate a model such as a skeletal model, which will be described in more detail below.

At 310, the target recognition, analysis, and tracking system may determine whether the depth image includes a human target. For example, at 310, each target or object in the depth image may be flood filled and compared to a pattern to determine whether the depth image includes a human target.

Figure 7:
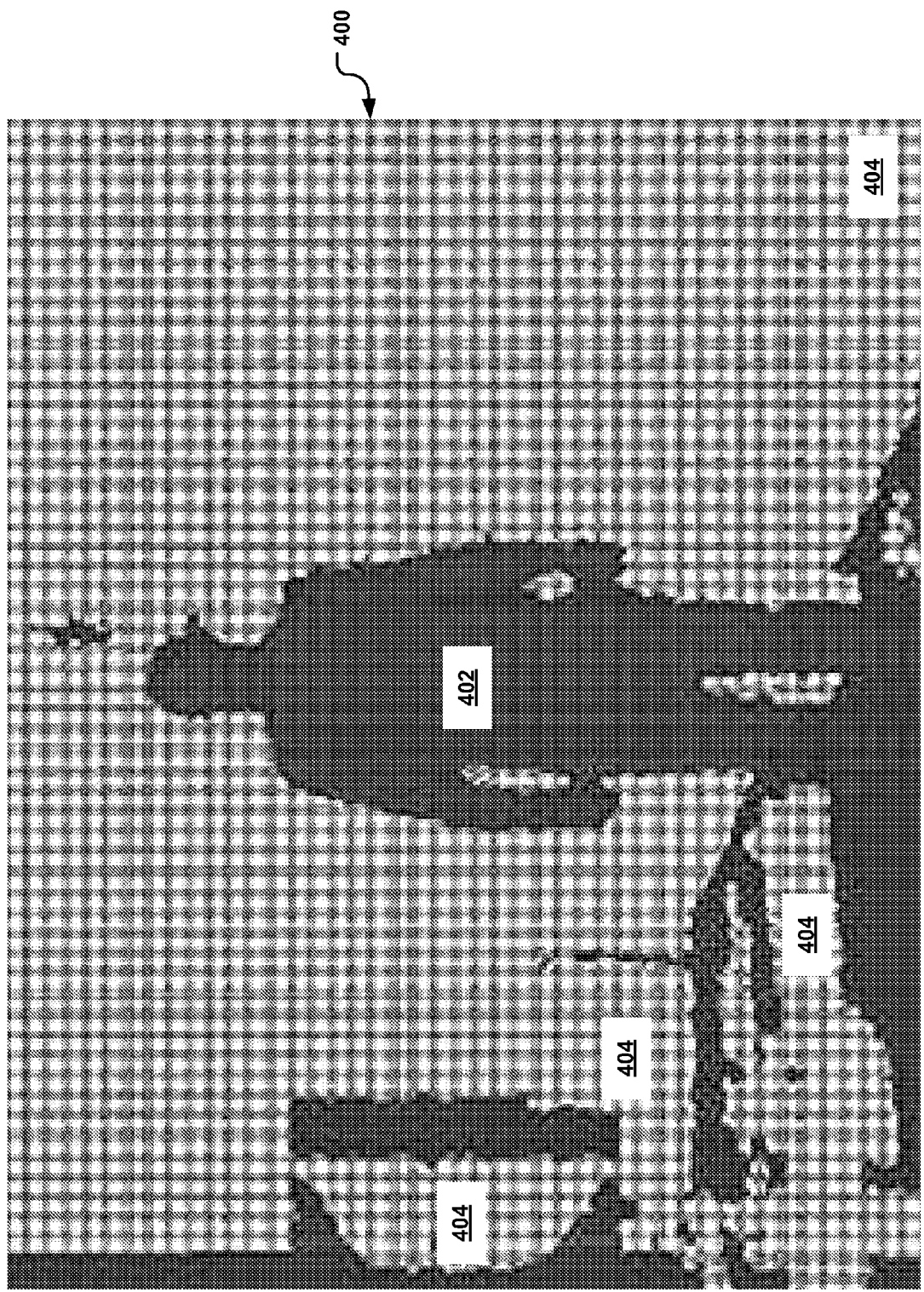
FIG. 7 illustrates an example embodiment of a depth image with a flood filled human target.

FIG. 7 illustrates an example embodiment of the depth image 400 with the human target 402 flood filled. According to one embodiment, upon receiving the depth image 400, each target in the depth image 400 may be flood filled. For example, in one embodiment, the edges of each target such as the human target 402 and the non-human targets 404 in the captured scene of the depth image 400 may be determined. As described above, the depth image 400 may include a two-dimensional (2-D) pixel area of the captured scene where each pixel in the 2-D pixel area may represent a depth value such as a length or distance in, for example, centimeters, millimeters, or the like of an object in the captured scene from the camera. According to an example embodiment, the edges may be determined by comparing various depth values associated with, for example, adjacent or nearby pixels of the depth image 400. If the various depth values being compared may be greater than a predetermined edge tolerance, the pixels may define an edge. In one embodiment, the predetermined edge tolerance may be, for example, a 100 millimeters. If a pixel representing a depth value of 1000 millimeters may be compared with an adjacent pixel representing a depth value of 1200 millimeters, the pixels may define an edge of a target, because the difference in the length or distance between the pixels is greater than the predetermined edge tolerance of 100 mm.

Additionally, as described above, the capture device may organize the calculated depth information including the depth image into "Z layers," or layers that may be perpendicular to a Z axis extending from the camera along its line of sight to the viewer. The likely Z values of the Z layers may be flood filled based on the determined edges. For example, the pixels associated with the determined edges and the pixels of the area within the determined edges may be associated with each other to define a target or an object in the scene that may be compared with a pattern, which will be described in more detail below According to another embodiment, upon receiving the depth image 400, predetermined points or areas on the depth image 400 may be flood filled to determine whether the depth image 400 includes the human target 402. For example, various depth values of pixels in a selected area or point of the depth image 400 may be compared to determine edges that may define targets or objects as described above. The likely Z values of the Z layers may be flood filled based on the determined edges. For example, the pixels associated with the determined edges and the pixels of the area within the edges may be associated with each other to define a target or an object in the scene that may be compared with a pattern, which will be described in more detail below.

In an example embodiment, the predetermined points or areas may be evenly distributed across the depth image. For example, the predetermined points or areas may include a point or an area in the center of the depth image, two points or areas in between the left edge and the center of the depth image, two points or areas between the right edge and the center of the depth image, or the like.

Figure 8:
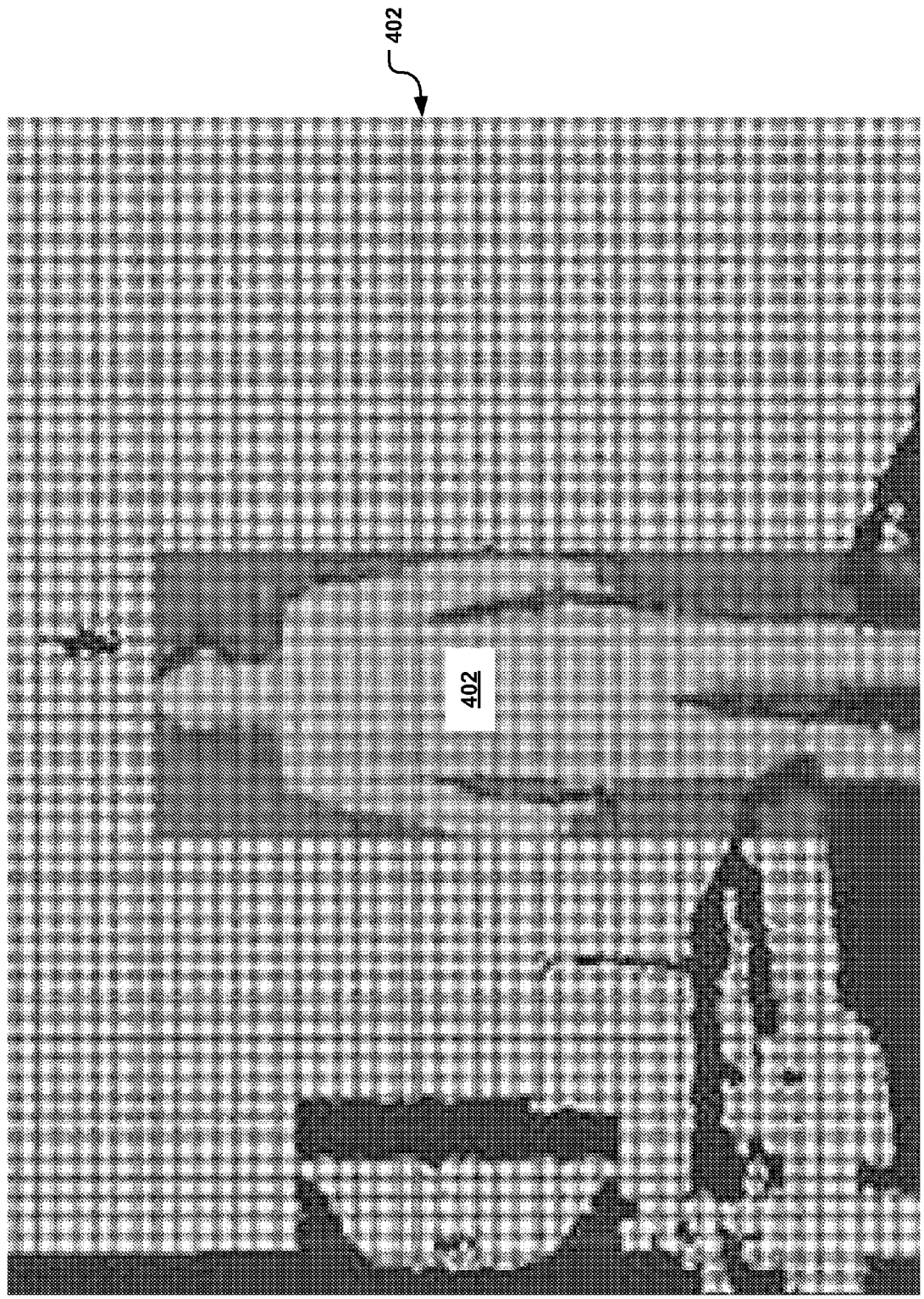
FIG. 8 illustrates an example embodiment of a depth image with a flood filled human target matched against a pattern.

FIG. 8 illustrates an example embodiment of a depth image such as the depth image 400 with the flood filled human target 402 matched against a pattern. According to an example embodiment, each of the flood filled targets such as the human target 402 and the non-human targets 404 may be matched against a pattern to determine whether and/or which of the targets in the scene include a human. The pattern may include, for example, a machine representation of a predetermined body model associated with a human in various positions or poses such as a typical standing pose with arms to each side.

According to an example embodiment, the pattern may include one or more data structures that may have a set of variables that collectively define a typical body of a human such that the information associated with the pixels of, for example, the human target 402 and the non-human targets 404 may be compared with the variables to determine whether and which of the targets may be a human. In one embodiment, each of the variables in the set may be weighted based on a body part. For example, various body parts such as a head and/or shoulders in the pattern may have weight value associated therewith that may be greater than other body parts such as a leg. According to one embodiment, the weight values may be used when comparing a target such as the human target 402 and the non-human targets 404 with the variables to determine whether and which of the targets may be human. For example, matches between the variables and the target that have larger weight values may yield a greater likelihood of the target being human than matches with smaller weight values.

Additionally, in an example embodiment, a confidence value may be calculated that indicates, for example, the accuracy to which each of the flood filled targets in the depth image 400 corresponds to the pattern. The confidence value may include a probability that each of the flood filled targets may be a human. According to one embodiment, the confidence value may be used to further determine whether the flood filled target may be a human. For example, the confidence value may compared to a threshold value such that if the confidence value exceeds the threshold, the flood filled target associated therewith may be determined to be a human target.

Referring back to FIG. 3, at 315, if the depth image does not include a human target, a new depth image of a scene may be received at 305 such that the target recognition, analysis, and tracking system may determine whether the new depth image may include a human target at 310.

At 315, if the depth image includes a human target, the human target may be scanned for one or more body parts at 320. According to one embodiment, the human target may be scanned to provide measurements such as length, width, or the like associated with one or more body parts of a user such as the user 18 described above with respect to FIGS. 1A and 1B such that an accurate model of the user may be generated based on such measurements, which will be described in more detail below.

In an example embodiment, the human target may be isolated and a bitmask of the human target may be created to scan for one or more body parts. The bitmask may be created by, for example, flood filling the human target such that the human target may be separated from other targets or objects in the scene elements. The bitmask may then be analyzed for one or more body parts to generate a model such as a skeletal model, a mesh human model, or the like of the human target.

Figure 9:
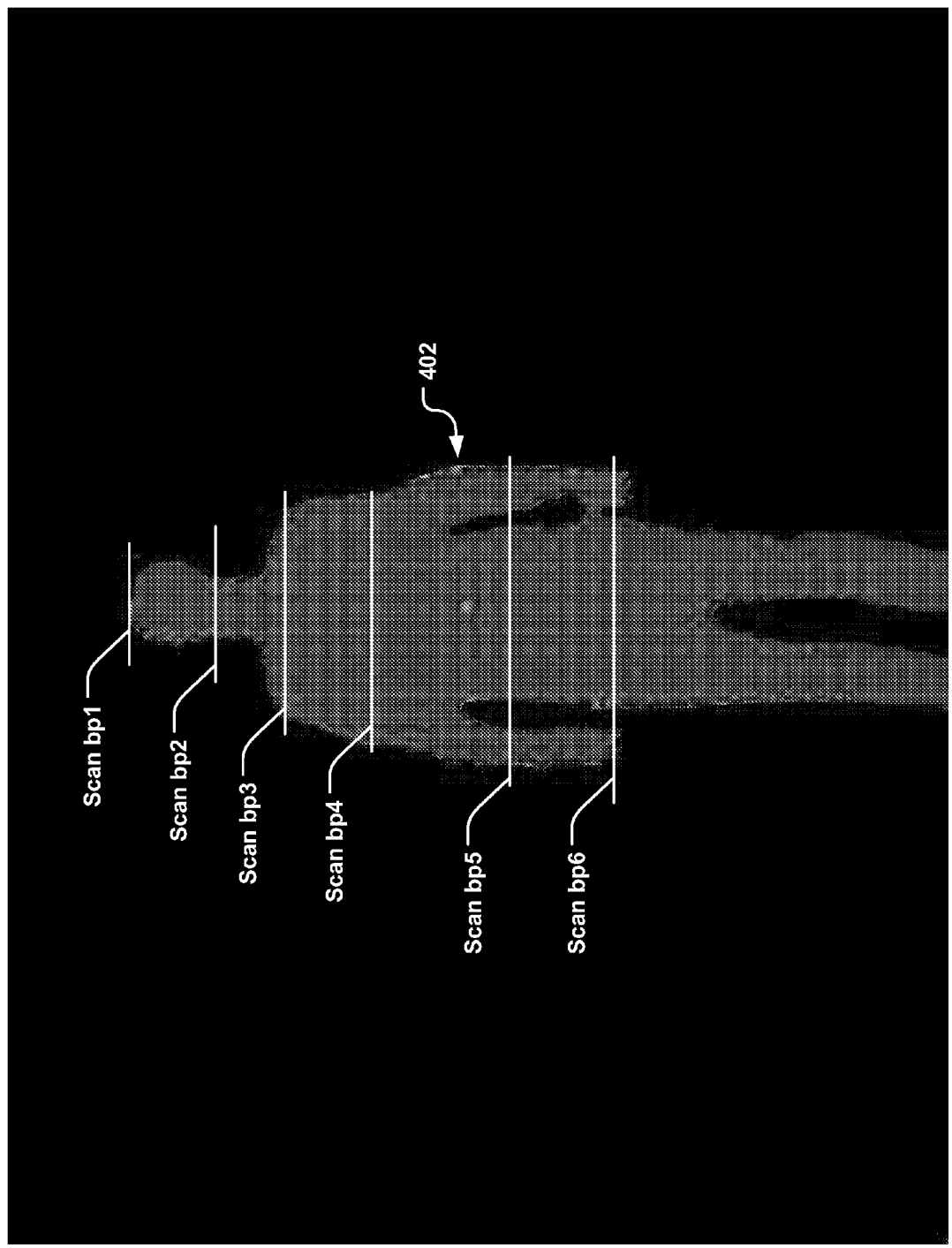
FIG. 9 illustrates an example embodiment of a depth image a human target being scanned to generate a model.

FIG. 9 illustrates an example embodiment of a depth image 400 that includes a human target 402 being scanned to generate a model. For example, after a valid human target such as the human target 402 may be found within the depth image 400, the background or the area of the depth image not matching the human target may be removed. A bitmask may then be generated for the human target 402 that may include values of the human target along, for example, an X, Y, and Z axis. According to an example embodiment, the bitmask of the human target 402 may be scanned for various body parts, starting with, for example, the head to generate a skeletal model of the human target 402.

As shown in FIG. 9, the information such as the bits, pixels, or the like associated with the matched human target 402 may be scanned to determine various locations such as scan bp1-scan bp6 that are associated with various parts of the body of the human target 402. For example, after removing the background or area surrounding the human target 402 in the depth image, the depth image 400 may include the human target 402 isolated. The bitmask that may include X, Y, and Z values may then be generated for the isolated human target 402. The bitmask of the human target 402 may be scanned to determine various body parts. For example, a top of the bitmask of the human target 402 may initially be determined. As shown in FIG. 9, the top of the bitmask of the human target 402 may be associated with a location of the top of the head as indicated by scan bp1. After determining the top of the head, the bitmask may be scanned downward to then determine a location of a neck of the human target 402, a location of the shoulders of the human target 402, or the like.

According to an example embodiment, to determine the location of the neck, shoulders, or the like of the human target 402, a width of the bitmask, for example, at a position being scanned, may be compared to a threshold value of a typical width associated with, for example, a neck, shoulders, or the like. In an alternative embodiment, the distance from a previous position scanned and associated with a body part in a bitmask may be used to determine the location of the neck, shoulders or the like.

In one embodiment, to determine the location of the shoulders, the width of the bitmask at the position indicated by scan bp3 in FIG. 9 may be compared to a threshold shoulder value. For example, a distance between the two outer most Y values at the X value of the bitmask at the position indicated by scan bp3 in FIG. 9 may be compared to the threshold shoulder value of a typical distance between, for example, shoulders of a human. Thus, according to an example embodiment, the threshold shoulder value may be a typical width or range of widths associated with shoulders of a body model of a human.

In another embodiment, to determine the location of the shoulders, the bitmask may be parsed downward a certain distance from the head. For example, the top of the bitmask that may be associated with the top of the head may have an X value associated therewith. A stored value associated with the typical distance from the top of the head to the top of the shoulders of a human body may then added to the X value of the top of the head to determine the X value of the shoulders. Thus, in one embodiment, a stored value may be added to the X value associated with scan bp1 shown in FIG. 9 to determine the X value associated with the shoulders at scan bp3.

In one embodiment, some body parts such as legs, feet, or the like may be calculated based on, for example, the location of other body parts. For example, as described above, the information such as the bits, pixels, or the like associated with the human target 402 may be scanned to determine the locations of various body parts of the human target 402 represented by scan bp1-scan bp6 in FIG. 9. Based on such locations, subsequent body parts such as legs, feet, or the like may then be calculated for the human target 402.

According to an example embodiment, upon determining the values of, for example, a body part, a data structure may be created that may include measurement values such as length, width, or the like of the body part associated with the scan of the bitmask of the human target 402. In one embodiment, the data structure may include scan results averaged from a plurality depth images. For example, the capture device such as the capture device 20 described above with respect to FIGS. 1A-2 may capture a scene in frames. Each frame may include a depth image. The depth image of each frame may be analyzed to determine whether a human target may be included as described above. If the depth image of a frame includes a human target, a bitmask of the human target of the depth image associated with the frame may be scanned for one or more body parts at 320. The determined value of a body part for each frame may then be averaged such that the data structure may include average measurement values such as length, width, or the like of the body part associated with the scans of each frame. According another embodiment, the measurement values of the determined body parts may be adjusted such as scaled up, scaled down, or the like such that measurements values in the data structure more closely correspond to a typical model of a human body.

Referring back to FIG. 3, at 325, a model of the human target may then be generated based on the scan. For example, according to one embodiment, measurement values determined by the scanned bitmask may be used to define one or more joints in a skeletal model. The one or more joints may be used to define one or more bones that may correspond to a body part of a human.

Figure 10:
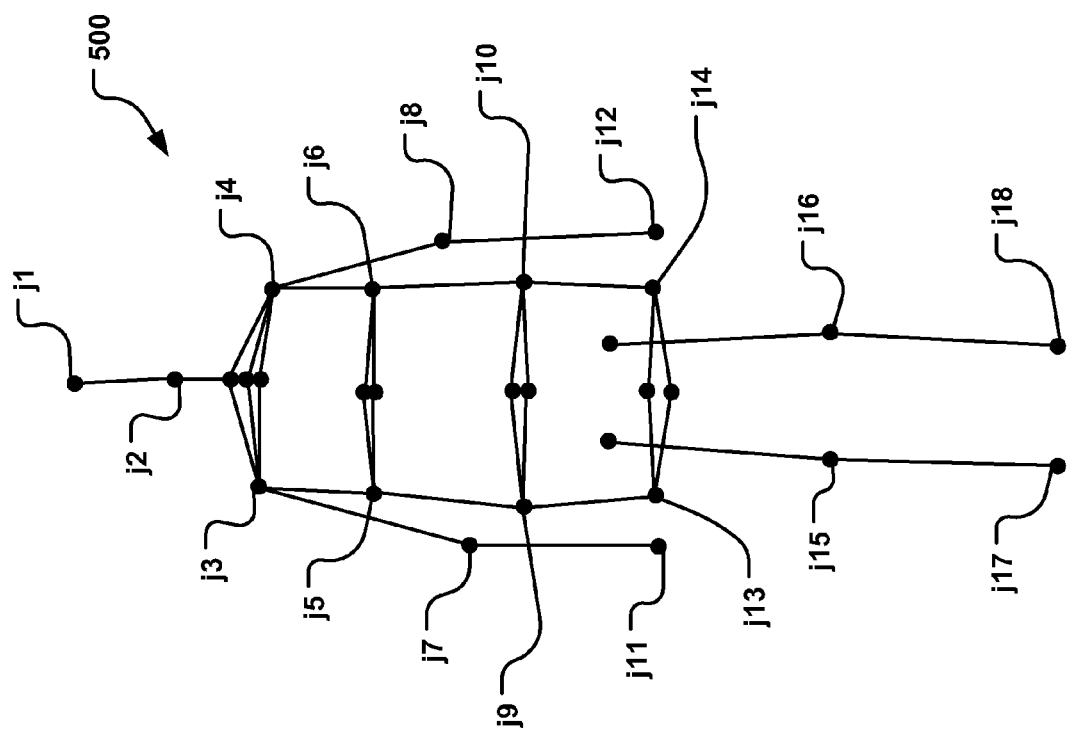
FIG. 10 illustrates an example embodiment of a skeletal model representing a scanned human target.

FIG. 10 illustrates an example embodiment of a skeletal model 500 representing a scanned human target. According to an example embodiment, the skeletal model 500 may include one or more data structures that may represent, for example, the human target 402 described above with respect to FIGS. 6-9 as a three-dimensional model. Each body part may be characterized as a mathematical vector defining joints and bones of the skeletal model 500.

As shown in FIG. 10, the skeletal model 500 may include one or more joints j1-j18. According to an example embodiment, each of the joints j1-j18 may enable one or more body parts defined there between to move relative to one or more other body parts. For example, a model representing a human target may include a plurality of rigid and/or deformable body parts that may be defined by one or more structural members such as "bones" with the joints j1-j18 located at the intersection of adjacent bones. The joints j1-j18 may enable various body parts associated with the bones and joints j1-j18 to move independently of each other. For example, the bone defined between the joints j7 and j11, shown in FIG. 10, corresponds to a forearm that may be moved independent of, for example, the bone defined between joints j15 and j17 that corresponds to a calf.

FIGS. 11A-11E illustrate an example embodiment of a joint being adjusted to generate the skeletal model 500 of the human target 402 described above with respect to FIGS. 9-10. According to an example embodiment shown in FIG. 11A, the initial scan of the bitmask may render a joint j4' that represents the left shoulder joint. As shown in FIG. 11A, the joint j4' may not accurately represent a typical location of a left shoulder joint of a human. The joint j4' may then be adjusted such that the joint may be repositioned along, for example, the X, Y, and Z axis to more accurately represent the typical location of a left shoulder joint of a human as shown by the joint j4 in FIG. 11E.

According to an example embodiment, to reposition the joint j4', a dY value associated with the distance between a reference point of the top of the scanned shoulder of the human target 402 and the joint j4' may be compared to a dX value associated with the distance between a reference point of the edge of the human target 402 and the joint j4'. If the dY value may be greater than the dX value, the joint j4' may be moved in a first direction such as up the Y axis by the dX value to generate a new left shoulder joint, represented by the joint j4" in FIG. 11B. Alternatively, if the dX value may be greater than the dY value, the joint j4' may be moved in a second direction such as right along the X axis by the dY value.

According to one embodiment, the joint j4' may be repositioned to render subsequent joints j4" and j4'" shown in FIGS. 11B and 11C until the repositioned joints may have an s value that may be within a range of a typical length of, for example, the shoulder blade to the joint as shown by the joint j4 in FIG. 11E. For example, as described above, the joint j4' may be moved up along the Y axis by the dX value to generate the joint j4" in FIG. 11B. The dX and dY values of the joint j4" may then be compared. If the dY value is greater than the dX value, the joint j4" may be moved up along the Y axis by the dX value. Alternatively, if the dX value is greater than the dY value, the joint j4" may be moved to the right along the X axis by the dY value to generate another new left shoulder joint, represented by the joint j4'" in FIG. 11C. In an example embodiment, the joint j4'" may then be adjusted as described above to generate another new left shoulder joint such that subsequent new left shoulder joints may be generated and adjusted until, for example, the dX and dY values of one of the new left shoulder joints may be equivalent or within a defined shoulder tolerance as represented by the joint j4"" in FIG. 11D. According to an example embodiment the joint j4"" may then be moved toward the shoulder edge or away from the shoulder edge at, for example, an angle such as a 45 degree angle to generate the joint j4 shown in FIG. 11E that includes an s value within the range of a typical length of, for example, the shoulder blade to the joint.

Thus, according to an example embodiment, one or more joints may be adjusted until such joints may be within a range of typical distances between a joint and a body part of a human to generate a more accurate skeletal model. According to another embodiment, the model may further be adjusted based on, for example, a height associated with the received human target to generate a more accurate skeletal model. For example, the joints and bones may be repositioned or scaled based on the height associated with the received human target.

At 330, the model may then be tracked. For example, according to an example embodiment, the skeletal model such as the skeletal model 500 described above with respect to FIG. 9 may be as a representation of a user such as the user 18 described above with respect to FIGS. 1A and 1B. As the user moves in physical space, information from a capture device such as the capture device 20 described above with respect to FIGS. 1A and 1B may be used to adjust the skeletal model such that the skeletal model may accurately represent the user. In particular, one or more forces may be applied to one or more force-receiving aspects of the skeletal model to adjust the skeletal model into a pose that more closely corresponds to the pose of the human target in physical space.

In one embodiment, as described above, the skeletal model may be generated by the capture device. The skeletal model including any information associated with adjustments that may need to be made thereto may be provided to a computing environment such as the computing environment 12 described above with respect to FIGS. 1A-4. The computing environment may include a gestures library that may be used to determine controls to perform within an application based on positions of various body parts in the skeletal model.

The visual appearance of an on-screen character may then be changed in response to changes to the skeletal model being tracked. For example, a user such as the user 18 described above with respect to FIGS. 1A and 1B playing an electronic game on a gaming console may be tracked by the gaming console as described herein. In particular, a body model such as a skeletal model may be used to model the target game player, and the body model may be used to render an on-screen player avatar. As the game player straightens one arm, the gaming console may track this motion, then in response to the tracked motion, adjust the body model accordingly. The gaming console may also apply one or more constraints to movements of the body model. Upon making such adjustments and applying such constraints, the gaming console may display the adjusted player avatar.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

What is claimed:

1. A computer-readable storage medium excluding signals having stored thereon computer executable instructions for scanning a target in a captured scene, the computer executable instructions comprising instructions for:
   receiving a depth image of the scene, wherein the depth image includes the target;
   comparing the target with a pattern to determine that the target matches the pattern;
   scanning the target based on the comparison that determines that the target matches the pattern;
   generating a model of the target based on the scan; and
   providing the model to a computing system, wherein the computing system tracks one or more movements of the model, and wherein the computing system is controlled based on the tracked one or more movements.

2. The computer-readable medium of claim 1, wherein the pattern includes a machine representation of a predetermined body model associated with a human.

3. The computer-readable medium of claim 1, wherein the instructions for comparing the target with the pattern to determine whether the target matches the pattern further comprise instructions for calculating a confidence value that indicates an accuracy to which the target in the depth image corresponds to the pattern.

4. The computer-readable medium of claim 3, wherein the confidence value of the target is used to determine whether the depth image includes a human target.

5. The computer-readable medium of claim 1, wherein the instructions for scanning the target further comprise instructions for:
removing an area of the depth image not matching the target;
creating a bitmask of the target; and
scanning the bitmask to determine various body parts of the target.

6. The computer-readable medium of claim 1, wherein the model comprises a skeletal model.

7. A computer-implemented method of scanning a target in a captured scene comprising:
receiving a depth image of the scene, wherein the depth image includes the target;
comparing the target with a pattern to determine that the target matches the pattern;
scanning the target based on the comparison that determines that the target matches the pattern;
generating a model of the target based on the scan; and
providing the model to a computing system, wherein the computing system tracks one or more movements of the model, and wherein the computing system is controlled based on the tracked one or more movements.

8. The method of claim 7, wherein the pattern includes a machine representation of a predetermined body model associated with a human.

9. The method of claim 7, wherein comparing the target with the pattern to determine whether the target matches the pattern comprises calculating a confidence value that indicates an accuracy to which the target in the depth image corresponds to the pattern.

10. The method of claim 9, wherein the confidence value of the target is used to determine whether the depth image includes a human target.

11. The method of claim 7, wherein scanning the target comprises:
removing an area of the depth image not matching the target;
creating a bitmask of the target; and
scanning the bitmask to determine various body parts of the target.

12. The method of claim 7, wherein the model comprises a skeletal model.

13. A system for scanning a target in a captured scene comprising:
a processor that executes computer executable instructions; and
memory having stored therein the computer executable instructions comprising:
receiving a depth image of the scene, wherein the depth image includes the target;
comparing the target with a pattern to determine that the target matches the pattern;
scanning the target based on the comparison that determines that the target matches the pattern;
generating a model of the target based on the scan; and
providing the model to a computing system, wherein the computing system tracks one or more movements of the model, and wherein the computing system is controlled based on the tracked one or more movements.

14. The system of claim 13, wherein the pattern includes a machine representation of a predetermined body model associated with a human.

15. The system of claim 13, wherein the instructions for comparing the target with the pattern to determine whether the target matches the pattern further comprise instructions for calculating a confidence value that indicates an accuracy to which the target in the depth image corresponds to the pattern.

16. The system of claim 15, wherein the confidence value of the target is used to determine whether the depth image includes a human target.

17. The system of claim 13, wherein the instructions for scanning the target further comprise instructions for:
removing an area of the depth image not matching the target;
creating a bitmask of the target; and
scanning the bitmask to determine various body parts of the target.

18. The system of claim 13, wherein the model comprises a skeletal model.

* * * * *